(12) United States Patent
Fokine

(10) Patent No.: US 6,334,018 B1
(45) Date of Patent: Dec. 25, 2001

(54) OPTICAL MATERIAL HAVING PERIODICALLY VARYING REFRACTIVE INDEX AND METHOD OF MAKING

(75) Inventor: Michael Fokine, Bandhagen (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/254,930

(22) PCT Filed: Sep. 17, 1997

(86) PCT No.: PCT/SE97/01568

§ 371 Date: Jul. 29, 1999

§ 102(e) Date: Jul. 29, 1999

(87) PCT Pub. No.: WO98/12586

PCT Pub. Date: Mar. 26, 1998

(30) Foreign Application Priority Data

Sep. 17, 1996 (SE) .................................................. 9603406

(51) Int. Cl.[7] .......................................................... G02B 6/34
(52) U.S. Cl. ................................................ 385/124; 385/37
(58) Field of Search .............................. 385/10, 37, 123, 385/124, 130; 359/565, 566; 65/385, 415

(56) References Cited

U.S. PATENT DOCUMENTS

| | | | |
|---|---|---|---|
| 4,618,211 | * 10/1986 | Fleury, V ............................. | 385/123 |
| 5,218,651 | * 6/1993 | Faco et al. ............................. | 385/4 |
| 5,377,288 | * 12/1994 | Kashyap et al. ...................... | 385/37 |
| 5,495,548 | * 2/1996 | Bilodeau et al. ..................... | 385/123 |
| 5,500,031 | 3/1996 | Atkins et al. . | |
| 5,671,307 | * 9/1997 | Lauzon et al. ........................ | 385/37 |
| 5,675,691 | * 10/1997 | Edlinger et al. ...................... | 385/130 |
| 5,790,726 | * 8/1998 | Ito et al. ............................... | 385/37 |

* cited by examiner

Primary Examiner—Hemang Sanghavi
(74) Attorney, Agent, or Firm—Birch, Stewart, Kolasch & Birch, LLP.

(57) ABSTRACT

In order to produce a periodically varying refractive index in an optical material such as optical fiber, the concentration of a refractive index varying material, for example, fluorine, is periodically varied. A mobile substance is first diffused into the optical material. A portion of this mobile substance is periodically activated by application of periodically varying radiation supplied to the optical material having the mobile substance diffused therein. Molecular hydrogen may be used as such a mobile substance. After activation of the mobile substance, inactivated mobile substance is diffused out of the optical material, this diffusion step being accelerated by application of heat. Subsequently, the optical element is heated to a predetermined level to further react the mobile substance whit a component of the optical material which may then be diffused out of the optical material to produce a periodically varying optical property such as refractive index.

18 Claims, 12 Drawing Sheets

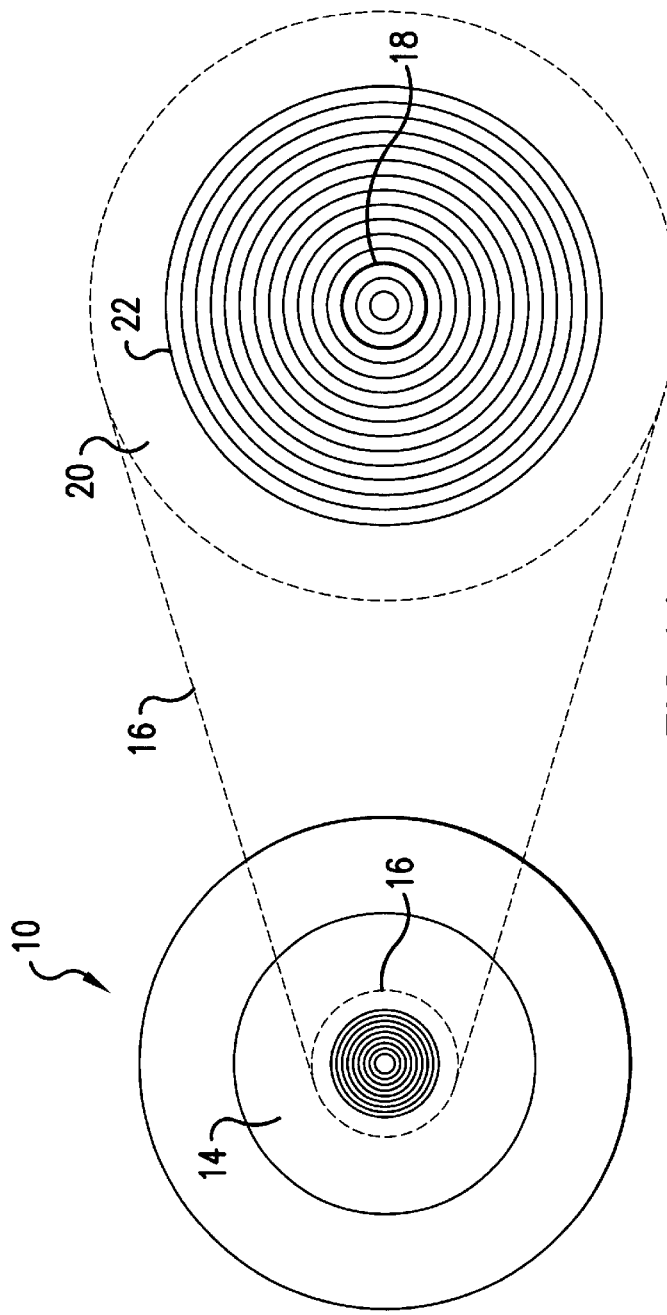
FIG.1A
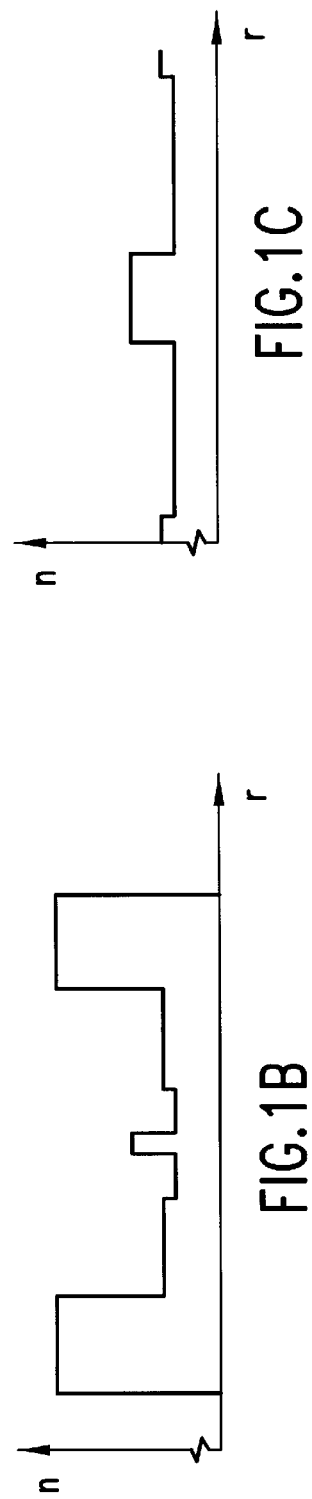

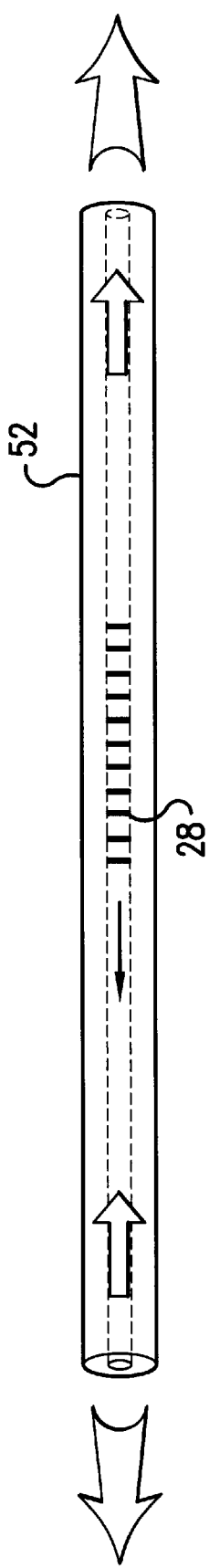
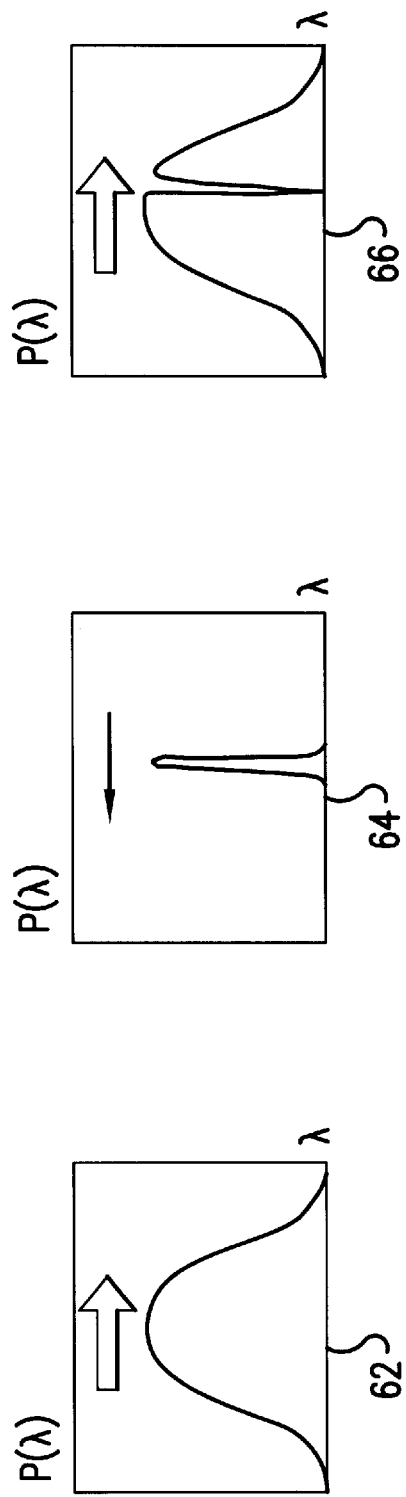

OPTICAL MATERIAL HAVING PERIODICALLY VARYING REFRACTIVE INDEX AND METHOD OF MAKING

This application is the national phase under 35 U.S.C. §371 of PCT International Application No. PCT/SE97/01568 which has an International filing date of Sep. 17, 1997 which designated the United States of America.

FIELD OF INVENTION

The present invention relates to an optical means and to a method of producing optical means in the form of material or components that has a spatially varying chemical composition which enables the manufacture of optical material or components whose optical properties vary spatially. The method is well suited to create refractive index variations in optical material for the manufacture of optical waveguides, or for creating or generating periodic refractive index variations in different types of waveguides.

BACKGROUND OF THE INVENTION

It is known that the refractive index of germanium-doped, $SiO_2$-based fibres (among others), can be changed by exposing the fibre to ultraviolet radiation within certain absorption intervals. The ultraviolet wavelengths used to create fraction index changes in holographic page-writing methods lie mainly within germanium-related absorption bands with a maximum at approximately 195 nm and approximately 240 nm, although other wavelength intervals have also been used, these latter wavelength intervals normally requiring much longer exposure times, however. It is possible to produce with holographic page-writing methods periodic refractive-index variations, so-called Bragg gratings, that function as wavelength selective mirrors or filters, with several applications within, e.g., telecommunications and laser or sensor applications.

Fibre gratings are described in the document "Fibre Gratings", Physics World, October 1993, Philip ST. J. Russell et al, pp. 41–46, and also in PCT publication WO 94/00784.

Although the actual process lying behind these index changes has not been fully established, it is generally considered that germanium defects—the concentration of $Ge^{2+}$(c.f., for instance, U.S. Pat. No. 5,157,747, Atkins et al) is the main reason for the resultant photosensitivity. The photosensitivity of a material is, e.g., its ability to change its refractive index upon given exposure to electromagnetic radiation. Although the photosensitivity of fibre can be enhanced in many different ways, the method used is still highly dependent on the use of wavelengths of approximately 195 nm and approximately 240 nm. Sensitivity to ultraviolet light can be enhanced by doping with more GeO or $GeO_2$ and/or $B_2O_3$.

U.S. Pat. No. 5,500,031, Atkins et al, teaches a method of increasing the refractive index of glassy material, by applying heat in conjunction with hydrogen sensitization. Such increases in refractive index are not temperature-stable at temperatures above 600° C. This patent specification teaches solely a method that is aimed at causing chemical reactions to take place over the space of time of some seconds and for temperatures higher than 500° C., and not to cause diffusion of material that has diffused into the material or of doping substances in the material. In order to cause diffusion, the material is heated to temperatures of from 800 to 1100° C. and over much longer times, for instance over minutes or hours.

It has been possible to increase the photosensitivity of certain fibres or waveguides, by diffusing hydrogen thereinto.

SUMMARY OF THE INVENTION

One object of the present invention is to provide optical means, and a method that uses optical material that has spatially varying optical properties, and also a method of manufacturing such optical material. The optical properties of an optical material are greatly influenced by the chemical composition of the material, which enables a spatial change of its optical properties to be obtained by spatially changing its chemical composition. The method is well suited for generating a spatially varying refractive index, and also in obtaining variations in the non-linearities and/or the electro- or magneto-optical properties of the optical material.

A change in the spatial chemical composition of an optical material means that gate writing will no longer be dependent on the wavelengths of 195 nm and 240 nm respectively, since the photosensitivity no longer depends on germanium defects that are related to these wavelengths.

To this end, the present invention provides an optical means which has a spatially varying chemical composition. The means has diffused therein mobile substances that have taken part in at least one chemical reaction in said means or in parts of said means, by supplying energy through electromagnetic radiation, via optical writing or by subjecting said means to predetermined temperature changes.

Further predetermined temperature changes in said means have caused diffused substances that have not taken part in the reaction to diffuse out from or through said means, and that predetermined temperature changes achieved by changing the energy supply via exposure to electromagnetic radiation, or temperature changes generated by some other form of energy, have caused the substance to diffuse out of said means or within said means, therewith changing the chemical structure and optical properties in this region. This results in a means that has a spatially varying chemical composition and spatially varying optical properties.

In one embodiment of the invention, said means is produced by a combination of or by repetition of at least two of the steps of diffusing mobile substances in said means, supplying energy via optical writing, and predetermining temperature change for diffusion of the substances into said means.

It is also a means for conducting electromagnetic radiation.

In one embodiment of the invention, variations in refractive index have been achieved via the steps of diffusing mobile substances into the means, supplying energy by exposing said means to electromagnetic radiation, via optical writing or by predetermined temperature changes, and predetermined temperature changes for diffusion of mobile substances that have not reacted chemically, and predetermined temperatures for diffusing said substances out of said means or within said means.

In another embodiment, spatially varying optical properties have been achieved in said means via the steps of diffusing mobile substances therein, supplying energy by exposing said means to electromagnetic radiation via optical writing or predetermined temperature changes, predetermined temperature changes for diffusion of mobile substances that have not reacted chemically, and predetermined temperature changes for diffusion of substances in said means.

The present invention also relates to a method of producing a spatially varying chemical composition in optical means by diffusing at least one mobile substance in said means;

inducing at least one chemical reaction between the diffused substance or substances and the optical means, by supplying energy through the medium of electromagnetic radiation via optical writing or by raising the temperature to a predetermined value;

changing the temperature of the means to a predetermined temperature level, therewith causing diffused substances that have not participated in said chemical reaction to diffuse out of or within said means; and changing the temperature of said means to a predetermined temperature level by changing the energy supply via exposure of the means to electromagnetic radiation, or by some other form of energy supply, so that the substances will diffuse out of said means or within said means, therewith resulting in a chemically varying means having varying optical properties.

Alternatively, the method comprises a combination of or a repetition of these steps.

In one embodiment of the inventive method, the optical means includes fluorine, and either hydrogen, nitrogen or oxygen, or combinations thereof, is diffused into said optical means, therewith resulting in a higher concentration of hydroxyl groups that react with fluorine to form hydrogen fluoride, which can be readily caused to diffuse out of said means or within said means.

In another embodiment of the inventive method, the optical means includes halogens, and hydrogen, nitrogen, oxygen or a combination thereof are diffused into said optical means, therewith resulting in a higher concentration of hydroxyl groups that react chemically with said halogens to form substances that consist totally or partially of hydrogen and halogens that can be readily caused to diffuse out of said means or within said means.

In still another embodiment of the inventive method, the optical means includes alkali metals, and nitrogen, oxygen or combinations thereof are diffused into the material, therewith increasing the concentration of hydroxyl groups which react with the alkali metals to form substances that consist totally or partially of hydrogen and alkali metals, which can be readily caused to diffuse out of said means or within said means.

Said means may be comprised partially of silicon dioxide ($SiO_2$) and germanium oxide ($GeO_2$) and the fluorine. It may alternatively be comprised partially of silicon dioxide ($SiO_2$) and phosphorous oxide ($P_2O_5$) and said fluorine.

The inventive means is preferably a waveguide structure for conducting electromagnetic radiation. The waveguide structure may be an optical fibre or some other known waveguide.

The method steps result in variations in refractive index. They can also produce spatially varying optical properties, which in one embodiment of the invention consist in variations in the non-linearities and/or the electro-magneto optical properties of said means.

BRIEF DESCRIPTION OF THE DRAWINGS

So that the present invention will be more readily understood and features thereof become more apparent, embodiments of the invention will now be described with reference to the accompanying drawings, in which FIG. 1 illustrates a conventional light waveguide in the form of an optical fibre;

FIGS. 10 and 11 illustrate the use of an inventive optical fibre as a sensor.

DETAILED DESCRIPTION OF PREFERRED EMBODIMENTS

Figure 2:
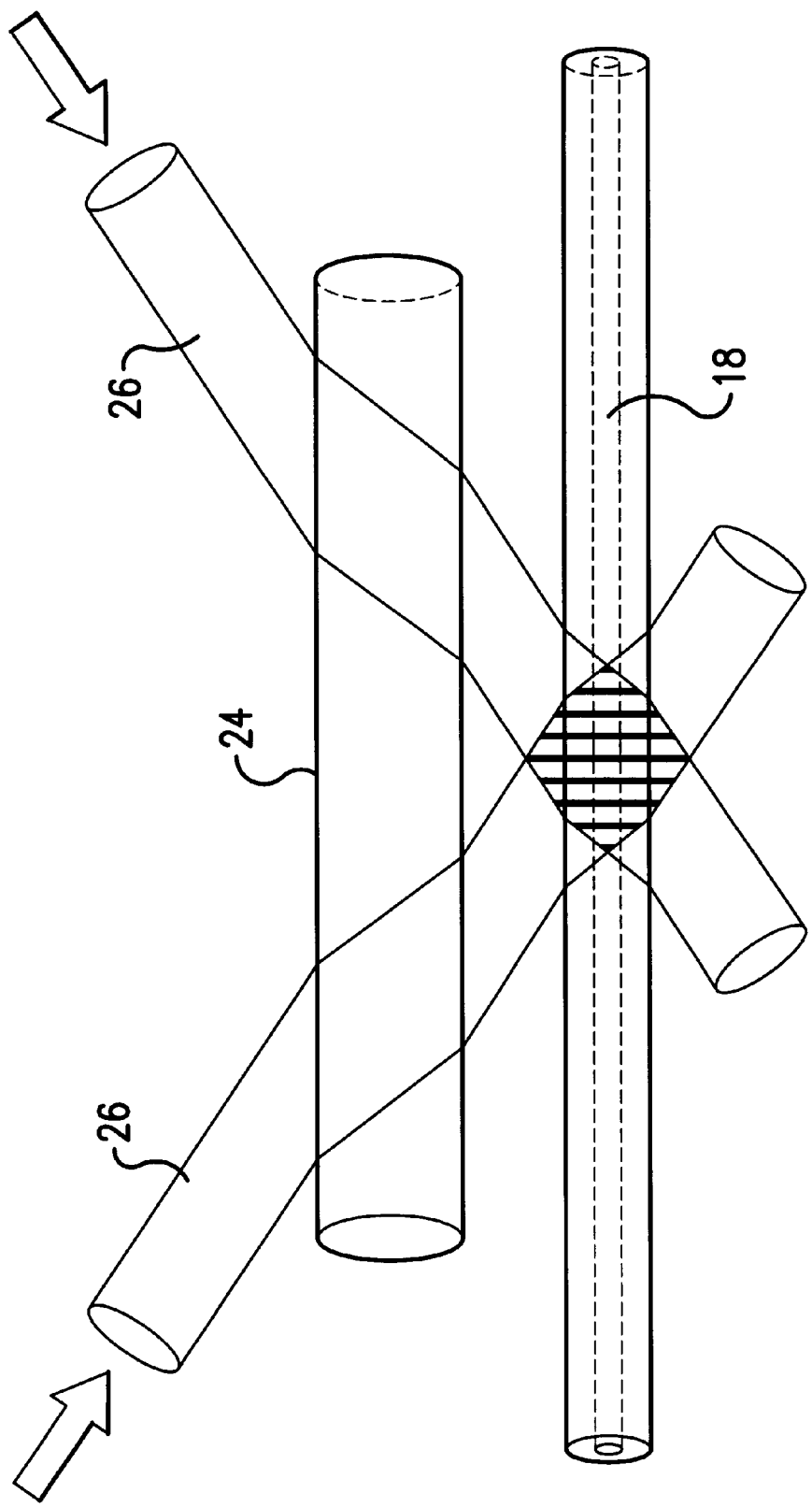
FIG. 2 illustrates an embodiment for holographic writing of a grating in an optical fibre with two beams of UV light.

A locally or periodically varying chemical structure (composition) of an optical means, also referred to as material or component, is obtained by diffusing into said optical material one or more substances and then causing or inducing local or periodic chemical reactions between the diffused substance or substances and said optical material. Further chemical reactions or structural changes in the optical means or material are prevented, by allowing those diffused substances that do not participate in a reaction to diffuse out of the material or component.

The aim of the chemical reactions is to create a spatial variation in the binding structure, i.e., a given atom or molecule has a spatially varying binding structure in the optical means. Since different molecular compositions exhibit different diffusion rates, depending on their chemical structure, it is possible to cause a given atom or molecule to exhibit a spatially varying diffusion rate, for instance by heating the optical material. Thus, it is possible to create spatially varying concentrations of certain atoms through the particular chemical composition of the material and the substance or substances diffused therein.

A periodically varying refractive index can be created by, e.g., periodically changing the fluorine concentration (F), which has a refractive index lowering effect.

The present invention enables, e.g., periodic refractive index variations to be achieved in waveguides in a completely novel manner, which has the advantages of enabling gratings to be written—a process in which an optical fibre is exposed to UV laser light to produce a grating—with wavelengths other than those within the earlier necessary wavelength intervals—approximately 195 nm, approximately 240 nm, therewith enabling less expensive and better light sources to be used, and providing greater flexibility in the production of gratings, for instance. This is due to the fact that the inventive method is not dependent on germanium-related defects, which have strong absorption bands at approximately 195 nm and approximately 240 nm and the ability to induce chemical reactions between the optical material and the substance diffused therein. It is therefore possible, for the same reason, to use other doping materials, than, e.g., germanium and boron in order to obtain high photosensitivity.

Changes induced in the optical material in accordance with the present invention are also very stable, since they are caused by a variation of the chemical composition of said material, which results in a greater useful life span and periodic refractive index changes that can withstand very high temperatures over a long period of time, as will be illustrated below with reference to FIG. 9.

A method of achieving a spatially varying chemical composition in optical material has been developed in accordance with the invention, this method comprising the steps of:

diffusing a mobile substance in the optical material or means, i.e. a substance or substances that can diffuse into or out of material without appreciably affecting its structure;

inducing at least one chemical reaction between the diffused substances in the region and the optical material, by supplying energy by exposing the material to electromagnetic radiation, through the medium of optical writing or heating;

changing the temperature of the optical material to a predetermined temperature, wherewith diffused substances that do not participate in said chemical reaction diffuse out of or within said optical material; and changing the temperature of the optical material to a predetermined temperature level by electromagnetic radiation or by some other temperature changing means that accelerates varying diffusion of the substances (atoms/molecules) within or out of said optical material, therewith to obtain a varying chemical composition of said material with changed optical properties.

These temperature changes can be achieved conveniently with the aid of ovens or other heating apparatus suitable for the purpose intended, or by exposing the optical means, or material, to electromagnetic radiation.

The fundamental concept (lone) of U.S. Pat. No. 5,500,031 is to supply energy to the material so as to induce chemical reactions therein, which is only one step of the inventive method. The additional, predetermined temperature changes to which the material is subjected are intended to empty the optical means of diffused substances that have not reacted chemically with said means. The temperature increases are such as to allow unreacted substances to diffuse out of or within said optical means, whereas those substances that have reacted in the optical means will not diffuse appreciably in those regions of said means that have been subjected to UV radiation or heat, for instance.

In contradistinction to the inventive method, the temperature increase taught by U.S. Pat. No. 5,500,031 is intended to generate as many heat-induced chemical reactions as possible. The reason why the patent mentions temperatures higher than 500° C. is because the major part of $H_2/D_2$ is therewith able to diffuse out of the material before chemical reactions take place at lower temperatures.

The method steps will be described hereinafter in more detail with reference to FIGS. 6–8.

The present invention also relates to an optical means that has a spatially varying chemical composition and which has mobile substances diffused therein. Subsequent to having been induced, the substances have undergone at least one chemical reaction with the optical means, by supplying energy to said means by exposing it to electromagnetic radiation via optical writing or by heating said means.

The means has been subjected to predetermined temperature changes, such as to cause diffused substances that have not participated in the reaction to diffuse out of said means.

Spatially varying diffusion of the substances (atoms/molecules) within said means or out of said means is accelerated by subjecting said means to at least one temperature change, by exposing said means to electromagnetic radiation or by changing said temperature in some other way, therewith obtaining an optical means of varying chemical composition and varying optical properties.

The purpose of the latter temperature change or temperature changes is to cause diffusion, and possibly further chemical reactions, of those substances that have earlier reacted with the optical means at high temperatures and therewith change the local or spatial chemical structure or composition of the optical means. This latter temperature-induced diffusion may also include substances that were earlier present in said means and substances that have diffused into said means and then reacted chemically with the glass via diffusion and the exposure of said means to ultraviolet light or heat, for instance. This predetermined temperature change is not mentioned in U.S. Pat. No. 5,500,031 and neither is it relevant to the patent.

The inventive method results in a change in the chemical structure or composition of the optical means, but solely at those places in said means into which mobile substances have diffused and a chemical reaction subsequently induced. In distinction, the patent U.S. Pat. No. 5,500,031 relates solely to the creation of chemical reactions within the whole of the region subjected to $H_2/D_2$ diffusion and heat treatment. This creates per se an index increase, which is also achieved in the case of the present invention, if the optical means includes germanium (even P-F doped glass according to the patent). However, this index increase is not temperature-stable. Those experiments described below with reference to the invention, see reference 46 in FIG. 8 below, show that index increases are, so to speak, "erased" during the process (prior to dip 46 in FIG. 8) and temperature-stable index changes are created in the optical means upon diffusion of said substances, due to induced chemical or structural changes (the increase after dip 46 in FIG. 8).

The change in the chemical composition of the optical material or component enables wide variations in refractive index to be achieved, therewith rendering the inventive method highly suitable for writing optical waveguide structures.

The inventive method was applied in laboratory trials on waveguides in the form of an MCVD (Modified Chemical Vapor Deposition) produced $SiO_2$ based fibre, where the waveguide part (the core) was doped with germanium (Ge) and with fluorine (F). Because of its refractive index raising properties, germanium was used to create a waveguide and also to generate hydroxyl groups (-OH) together with hydrogen ($H_2$) and/or deuterium diffused in the material. Fluorine was used in the trial because it has refractive index lowering properties and because it reacts chemically with hydroxyl groups (-OH) to form, among other things, hydrogen fluoride (HF), which is able to diffuse out of or within doped material more rapidly, i.e. it is essential that it diffuses out of the waveguide core.

Chemical reactions between hydroxyls and fluorine are described, inter alia, in "The Properties of Glass Surfaces", L. Holland, Chaplan and Hall, London 1964, and in the article "Hydrogen-Induced Hydroxyl Profiles in Doped Silica Layers", J. Kirchof et al, OFC '95, Technical Digest, pp. 178–179.

Hydrogen sensitization (enhancement of photosensitivity by hydrogen loading) for writing germanium defect-related gratings and partial OH formation is documented in "Enhanced UV Photosensitivity in Fibres and Waveguides by High Pressure Hydrogen Loading", P. J. Lemaire, OFC '95, Technical Digest, pp. 162–163. Photosensitivity in germania doped glass and hydroxyl formation with hydrogen sensitization is also discussed in "Photosensitive Index Changes in Germania Doped Silica Glass Fibres and Waveguides", D. L. Williams et al, SPIE Vol. 2044, pp. 55–68.

Since fluorine atoms bound solely to hydrogen have a much higher diffusion rate than fluorine that is bound to germanium (Ge) or silicon (Si), diffusion out of or within the material can be caused by HF, at the same time as fluorine (F) bound to GE or Si exhibits only slight diffusion, resulting in a spatial variation of fluorine in the core of the waveguide.

Because fluorine has an index lowering effect, a reduction in the fluorine content will result in an increase in the refractive index.

The article "Interactions of Hydrogen and Deuterium with Silica Optical Fibres: A Review", J. Stone, Journal of Lightwave Technology, Vol. LT-5, No. 5, May 1987, deals with hydrogen in glass and OH formation in different types of glass including Ge, P, F.

Those optical means that can be formed by means of the inventive method include the type of waveguide that has a varying refractive index, gratings, gratings that function as sensors, light wavelength mirrors, filters, strain gauges, temperature sensors that withstand high temperatures, etc.

Diffusion of different materials can often be described by the equation $D=D_0 e^{E/RT}$, where $D_0$ is a constant, E is the diffusion process activation energy, R=1.99 cal/K-mol is the gas constant, and T is the absolute temperature.

Hydrogen sensitization in combination with an induced chemical reaction changes the chemical structure of a material, which is used to vary the constants $D_0$ and E either locally or periodically. Separation of certain atoms or molecules is achieved by heating the optical material, due to their different diffusion rates.

In the case of doping with fluorine and the formation of hydroxyls, there takes place a "second" reaction which results in the formation of hydrogen fluoride (HF), which has a much higher diffusion rate than fluorine which is bound to other atoms or molecules. The HF diffusion requirement is coupled to the availability of fluorine and -OH. This affords greater flexibility when doping glass if hydroxyls are caused to form. Dopants other than germanium can then be used.

Strong evidence for the occurrent reactions exist in HF formation, although successful attempts to write "diffusion gratings" in boron-doped germanium fibres and in standard telecommunications fibres, which contain solely germanium and, of course, $SiO_2$, in accordance with the present invention.

A common feature of all types of germanium-related gratings is that they disappear, are erased, at temperatures in excess of about 500–900° C., depending on the type of fibre used. According to the present invention, a "diffusion grating" begins to grow at temperatures of about 800–1000° C., depending on the type of fibre used.

FIG. 1 is a schematic, cross-sectional illustration of the construction of a typical optical fibre 10 including a fibre-protective coating (e.g. acrylates, polymers, etc.) and a cladding 14 that functions as a refractive medium that surrounds the fibre core 18. The interior 16 and the core 18 of the fibre are enlarged in FIG. 1, wherewith the rings indicate the deposition of silicon dioxide in accordance with the MCVD method, for instance. The part-area 20 is comprised of crude silicon dioxide, whereas the area 22 containing the rings that extend to the core 18 is comprised of pure or refined silicon dioxide. The fibre core 18 is doped with germanium.

The graphs shown immediately beneath the cross-sectional views in FIG. 1 illustrate the variations in refractive index n along the radius r of the fibre.

In order for a fibre to conduct light without significant losses the total reflection is utilized, which can be achieved by virtue of the wave conducting part of the fibre having a higher refractive index than the cladding. Further demands are placed on the index difference relative to the diameter of the fibre core, in the propagation of a single light mode in a fibre.

With regard to flat waveguides (substrates), these can be manufactured and caused to function in accordance with the same principles as those applicable to fibres, i.e. with the high index core and lower index of a surrounding cladding. In the case of three-layer substrates, the central layer can be doped with Ge and F for instance, wherewith a waveguide can be written by slow exposure in the substrate. The other layers are doped with material, e.g. $SiO_2$, that is not influenced by the writing process.

FIG. 2 is a schematic illustration of an arrangement and an embodiment for writing a grating focused on the core 18 with the aid of a lens 24, in the illustrated case a cylindrical lens, while exposed to (irradiated by) two mutually interfering UV light beams 26 transmitted from a laser and having a wavelength of 240 nm, for instance. The region exposed has been doped in accordance with the aforegoing. Subsequent to the substances having diffused into the material and the grating having been written, which in itself induces the aforesaid reactions, the fibre is heated in accordance with the aforedescribed method.

Figure 3:
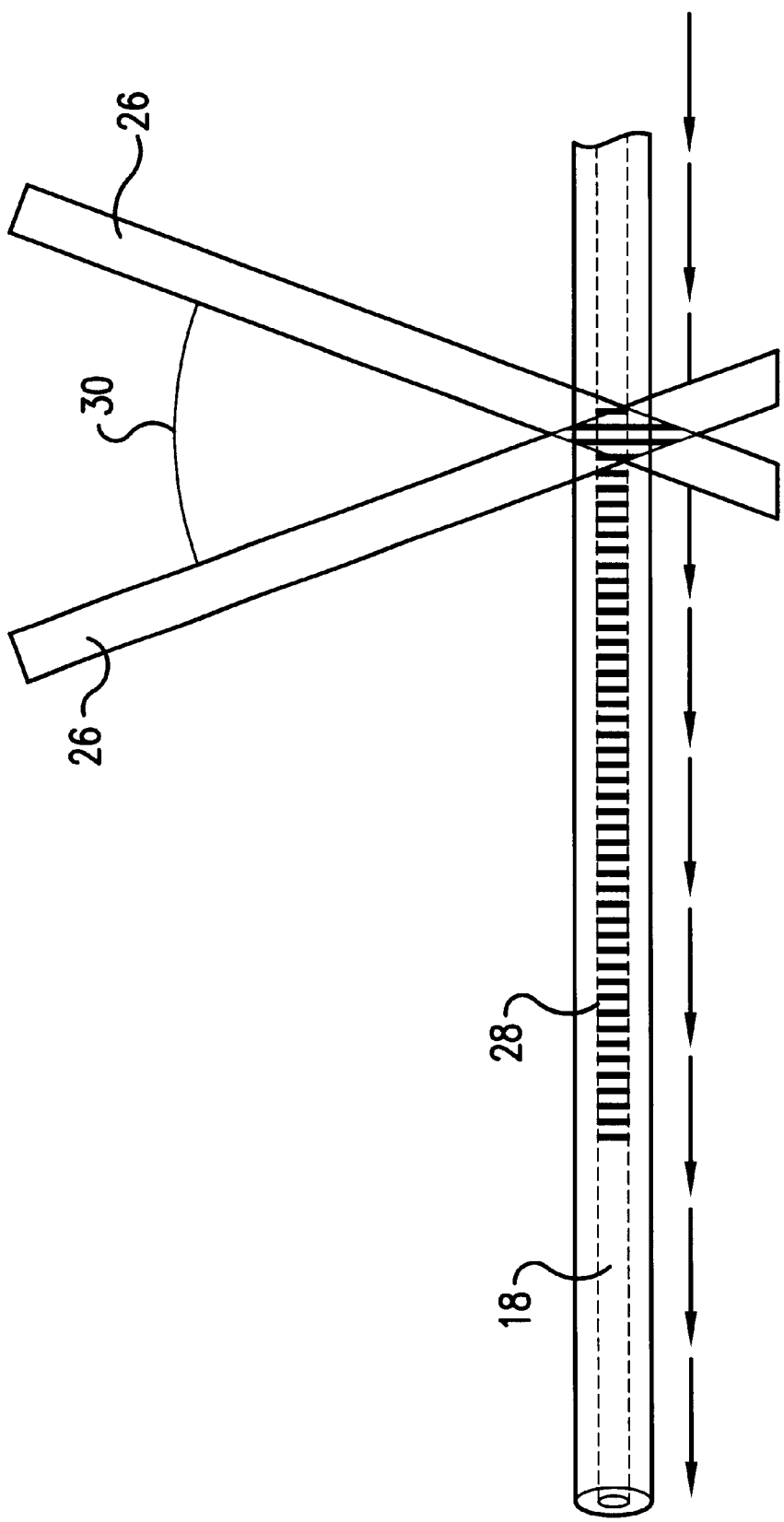
FIG. 3 illustrates the embodiment of FIG. 1 with interferometer-guided movement of the fibre whilst writing a grating.

FIG. 3 is a schematic illustration of the method shown in FIG. 2, but with the use of interferometer-controlled movement of the fibre so as to continuously write a grating 28 within a desired length of the fibre core. The fibre is moved in the directions of the arrows whilst controlled interferometrically. The circular arc 30 is intended to show the possibility of controlling the writing process angularly, so as to obtain a grating 18 that has the properties desired.

Figure 4:
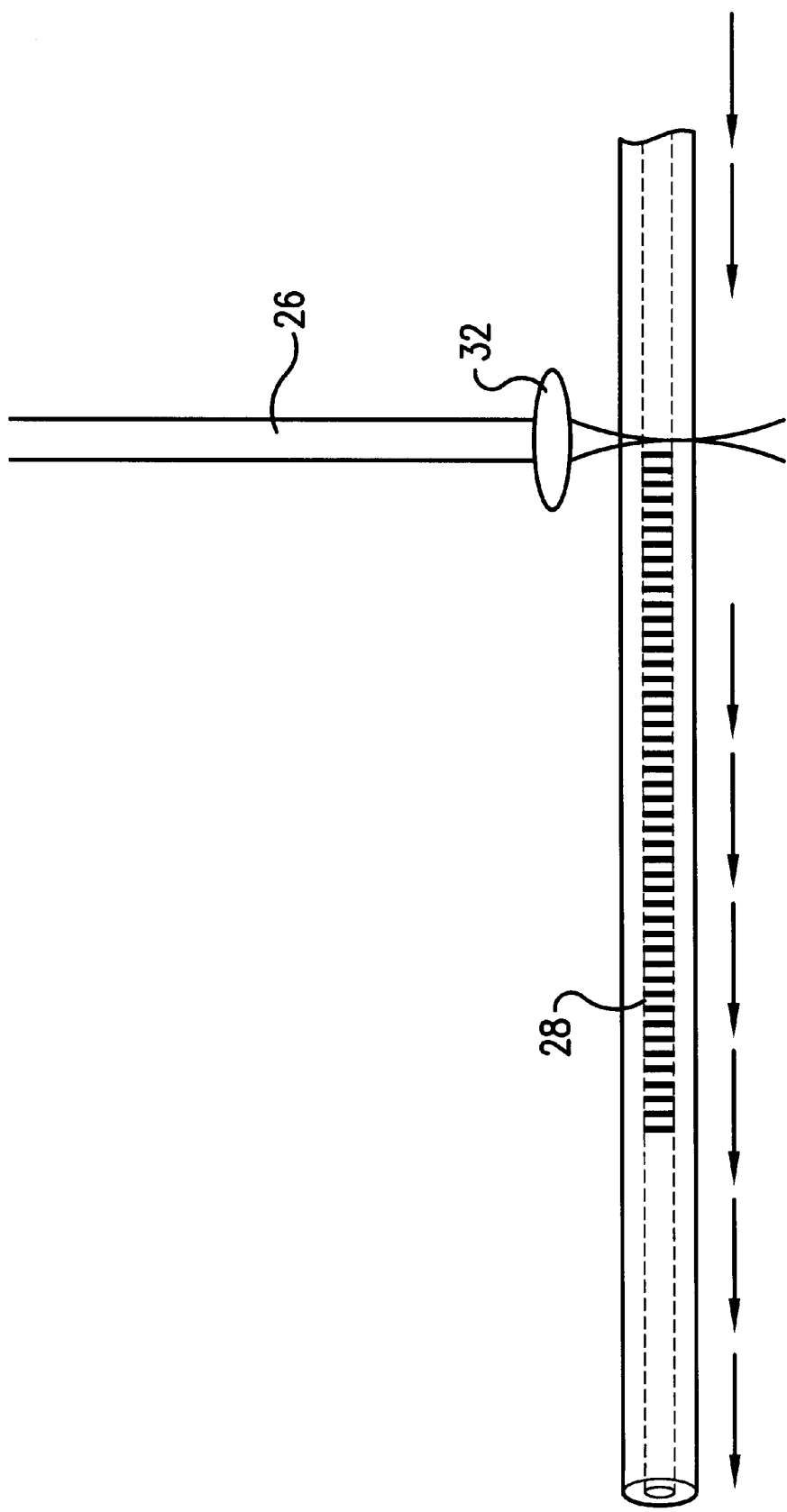
FIG. 4 illustrates an embodiment for writing a grating with interferometer-guided movement of a fibre that is irradiated with UV light in one direction.

Another grating writing embodiment is illustrated schematically in FIG. 4, where movement of the fibre is controlled in the same manner as that in the FIG. 3 embodiment, but with only one UV light beam 26 focused on the fibre core 18 by a lens 32.

Figure 5:
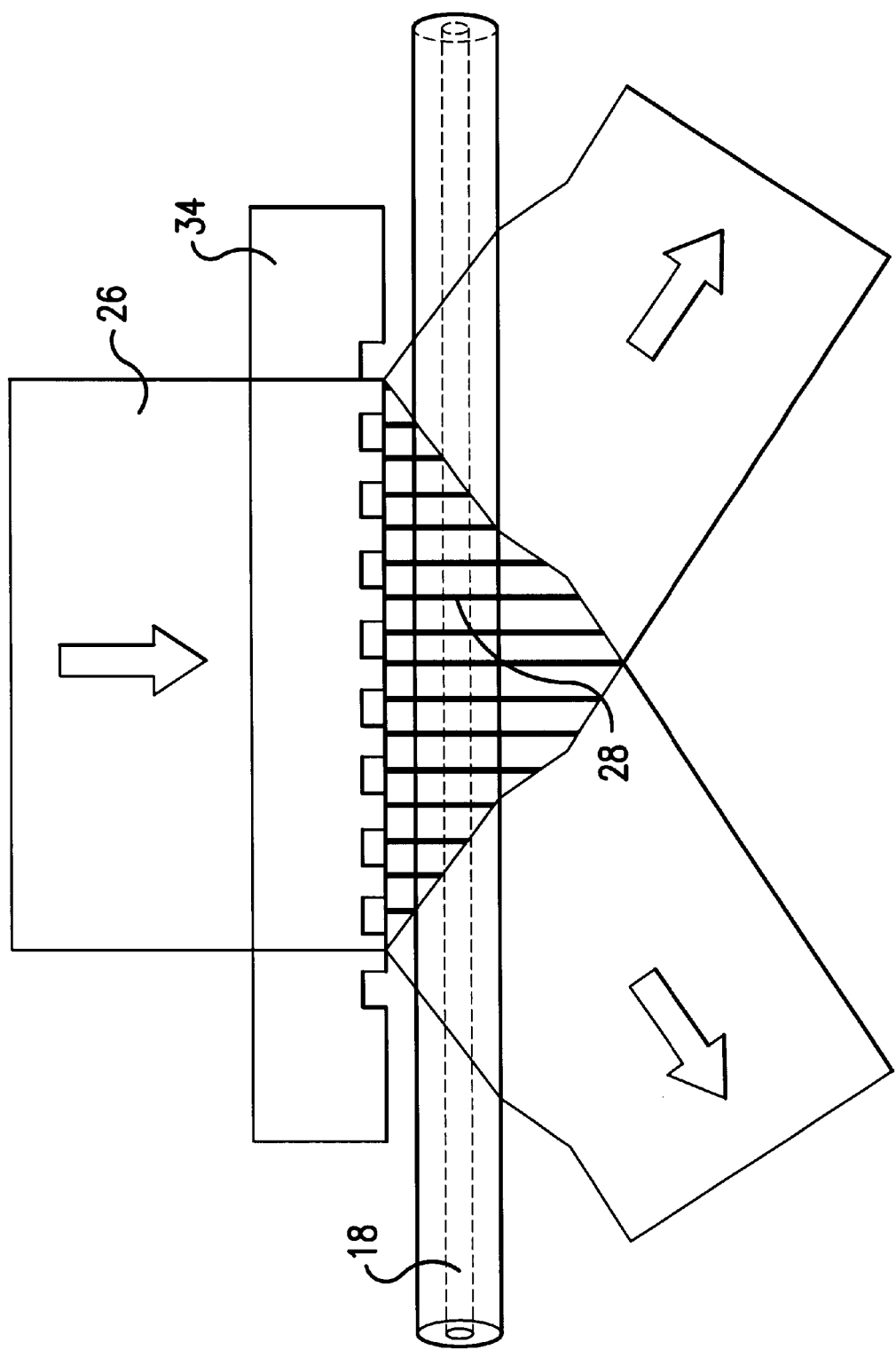
FIG. 5 illustrates an embodiment for writing a grating with UV light in a single beam through a phase mask.

FIG. 5 illustrates schematically a further embodiment for writing a grating 28 with UV light 26 which directly writes a grating within a specific area of the fibre core 18, via a so-called phase mask 34.

Although writing of gratings has been described in the aforegoing with the use of UV light, it will be understood that other electromagnetic radiation can also be used.

Figure 6:
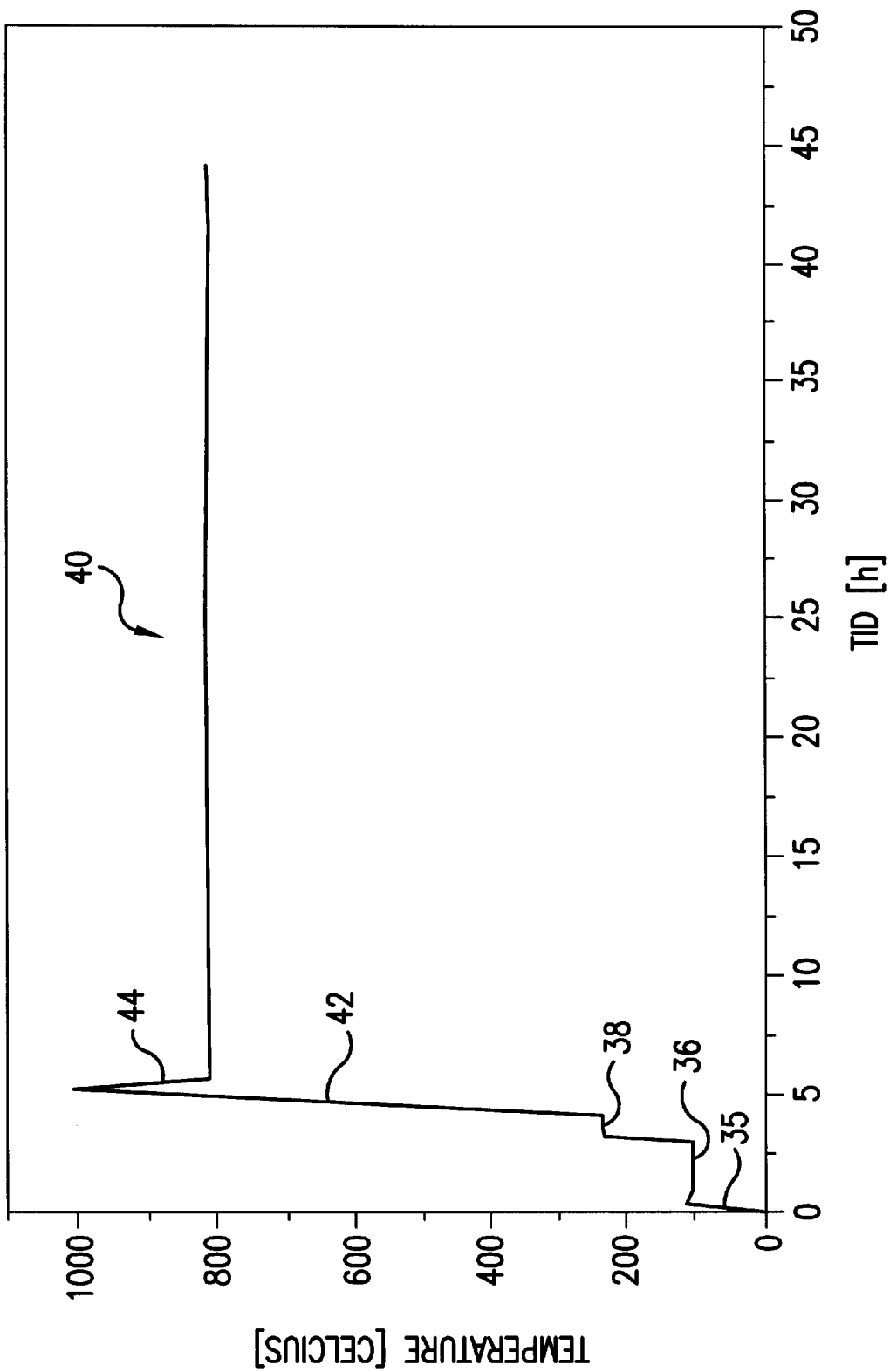
FIG. 6 is a graph that represents heating of a fibre and illustrates the inventive method.

FIG. 6 is a graph that illustrates the steps of developing a grating in a laboratory environment in accordance with the inventive method, with the temperature given on the ordinate and the time taken to write the grating being given on the abscissa. Prior to the temperature rises shown in the graph in FIG. 6, the fibre has been subjected to the diffusion of a mobile substance, in this case hydrogen, and then exposed to UV light in accordance with the aforedescribed method and with FIG. 2. The rise or gradient 35, the level 36, and the level 38 at which the temperature is held constant show the time period or step in the inventive method when those substances that have not participated in the chemical reaction as a result of exposure to UV light have diffused out of the fibre/fibre core.

According to the method, these steps can be combined or repeated, which has taken place with the temperature rise or the temperature change to level 38 at which diffusion from the core continues at a second constant temperature level.

The pronounced temperature rise, which is marked with the rise 42 and a subsequent temperature drop 44, whereafter the temperature is held constant for more than forty hours, constitutes the method step in which the substances (atoms/molecules) diffuse out of or within the fibre, wherewith the written grating having optical properties in accordance with the present invention is formed and a chemically stable state with a durable and heat-resistant grating is achieved.

Figure 7:
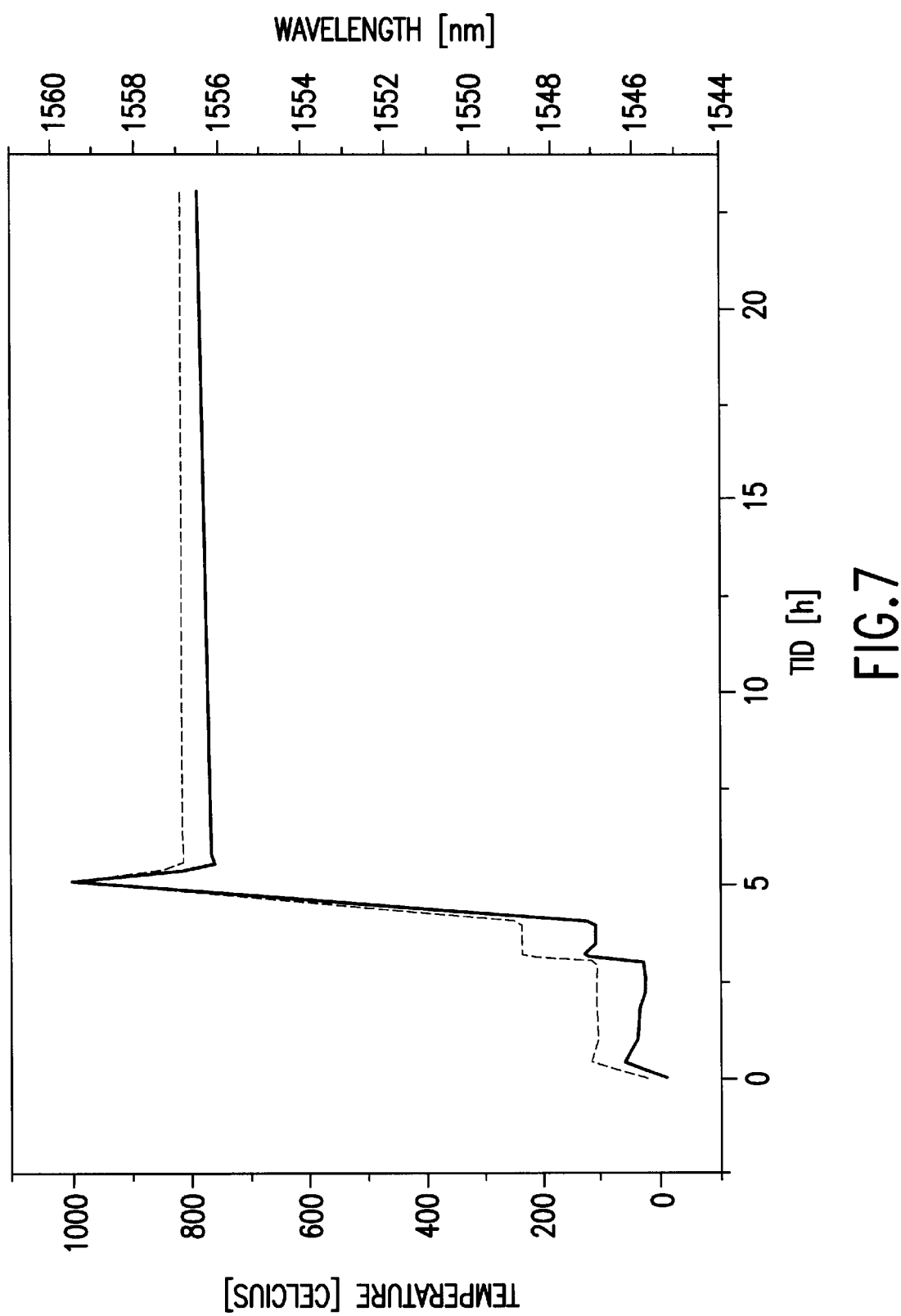
FIG. 7 is a graph that illustrates how different temperatures are linked to the reflection of a given waveguide length in a grating in accordance with the invention.

FIG. 7 illustrates how the reflection of different wavelengths can be related directly to temperature changes.

Figure 8:
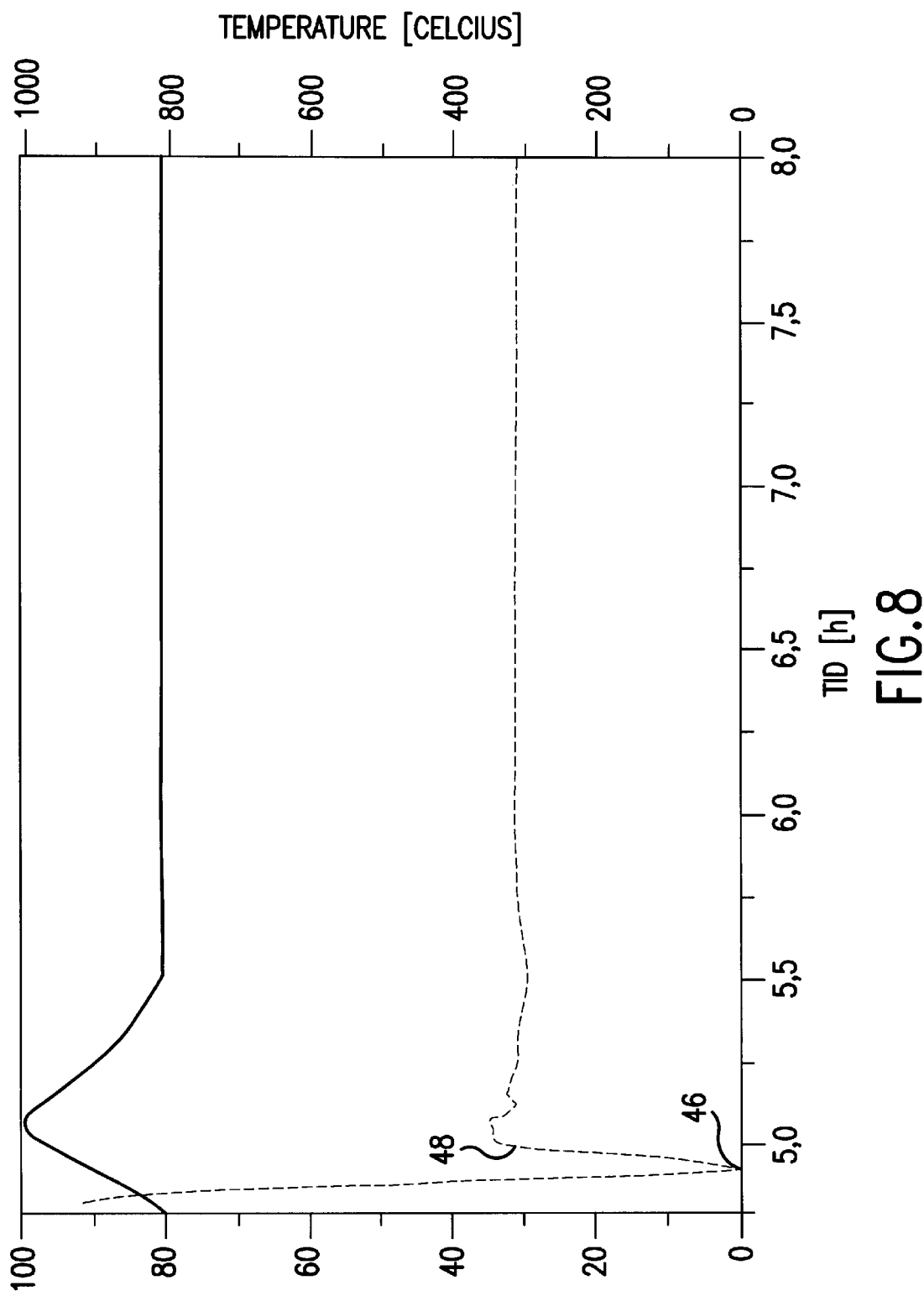
FIG. 8 is a graph that shows how a grating that has been written in accordance with the inventive method retains its reflectance subsequent to being heated to high temperature.

The graph shown in FIG. 8 is an enlarged part of the graph shown in FIG. 6 (full line), with the graph for the reflectance of the written grating inserted in a broken line. The dip 46 shown at the time approximately four hours on the abscissa shows how a typical germanium-related grating is erased at high temperatures. The graph derives from a grating produced in accordance with the present invention and illustrates how the reflectance 48 then grows and is recreated by spatial/periodic diffusion of the substances, to become constant in time despite the high temperature. This cannot be achieved with a conventional grating. The scale of the reflectance in FIG. 8 is normalized.

Figure 9:
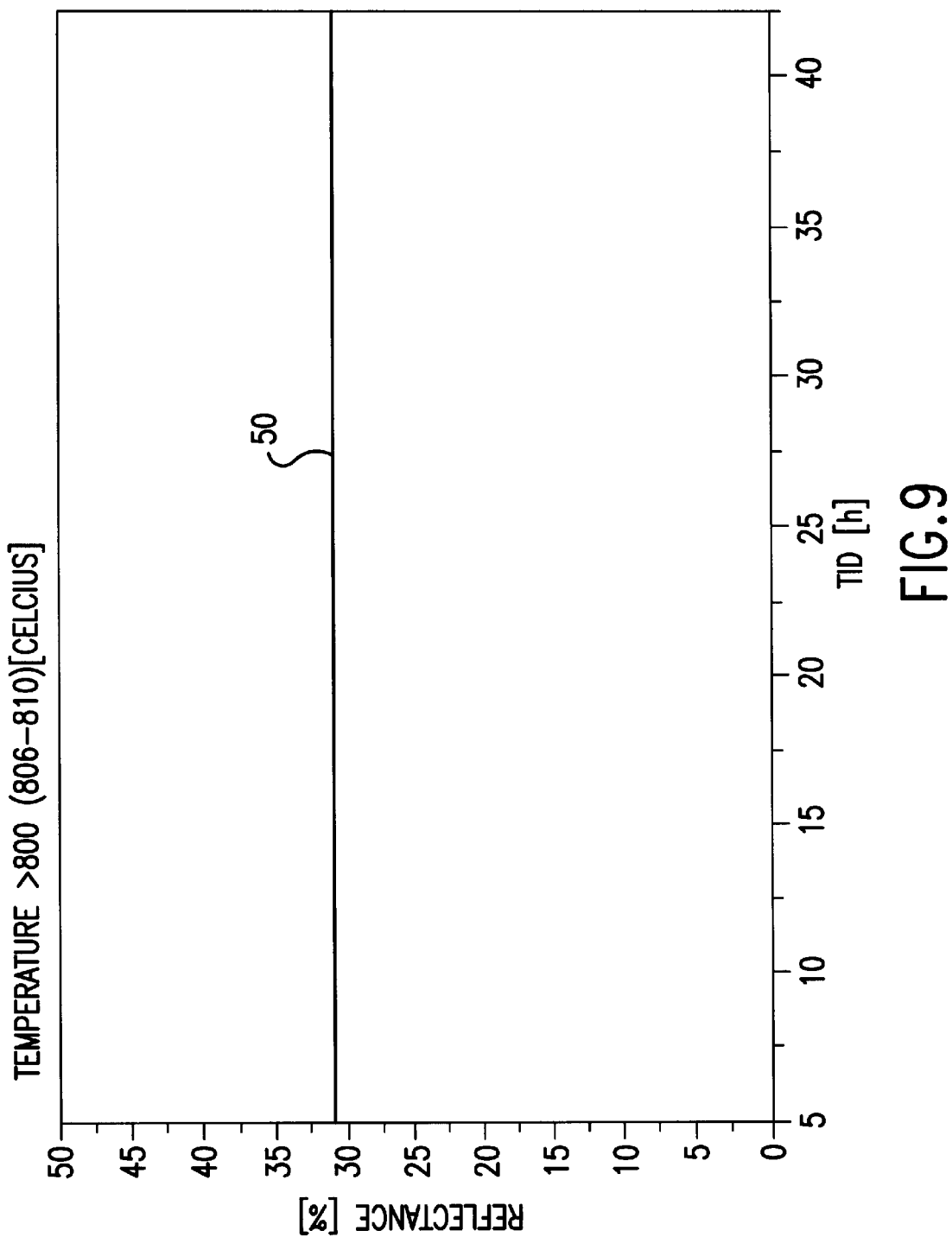
FIG. 9 is a graph that shows how the grating written in accordance with FIG. 8, for instance, retains its reflectance subsequent to said reflectance having been restored in accordance with the inventive method.
Figure 10A:
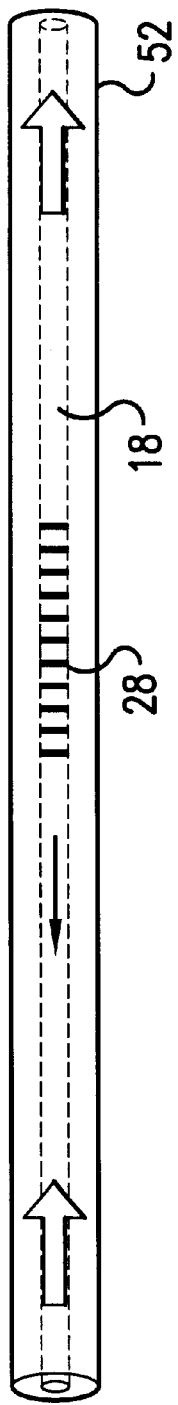
Figure 10D:
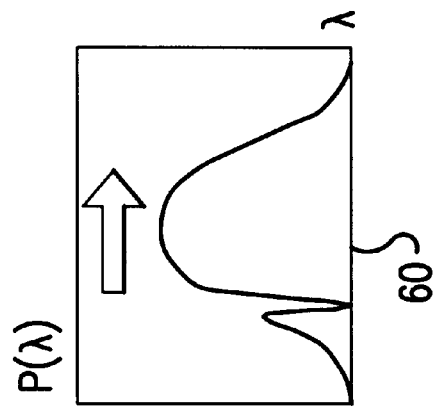
Figure 10C:
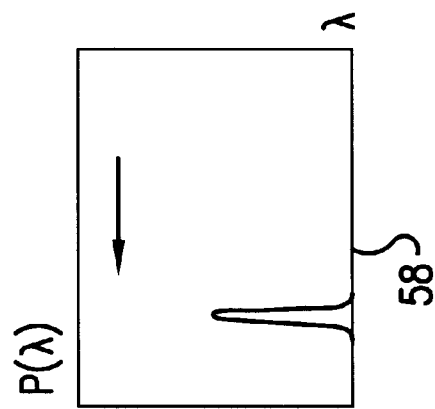
Figure 10B:
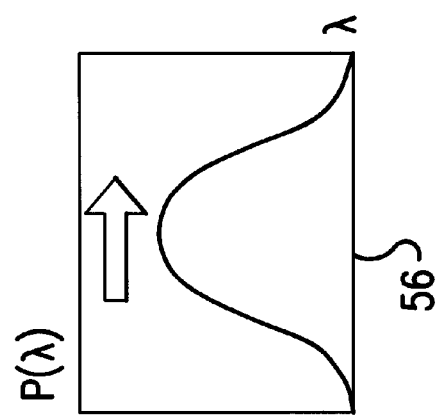
Figure 12A:
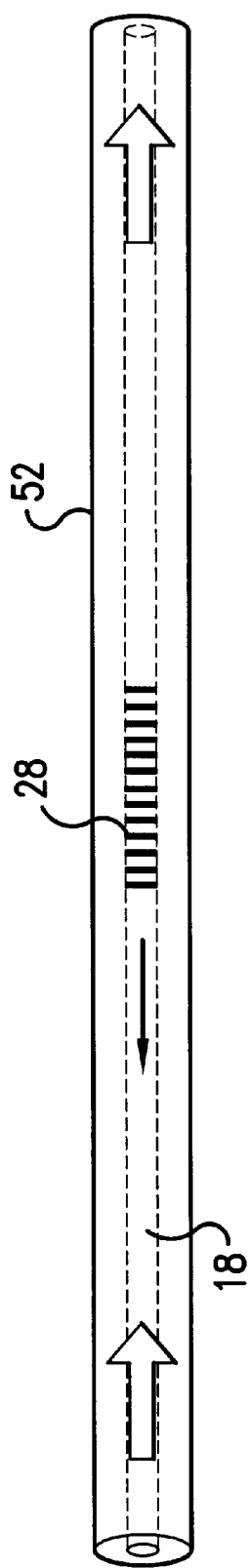
FIG. 12 illustrates how a specific wavelength is reflected and recovered through the medium of a grating in accordance with the invention.
Figure 12D:
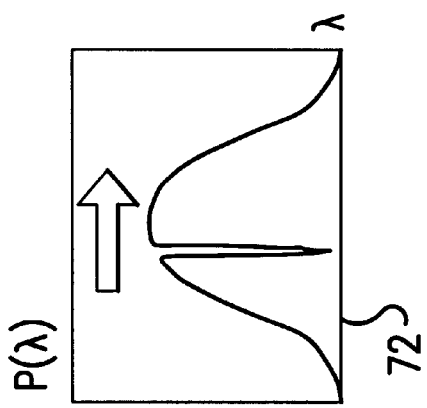
Figure 12C:
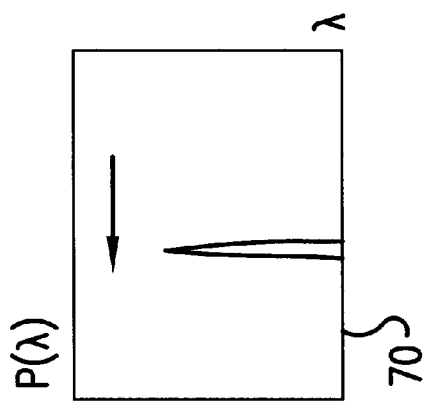
Figure 12B:
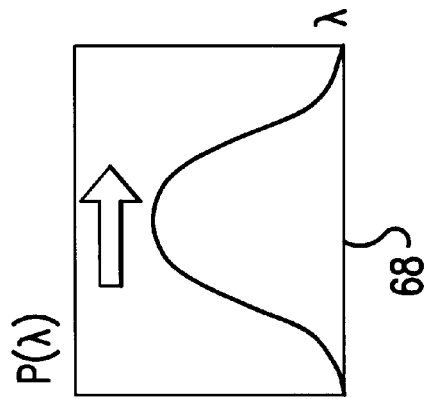

FIG. 9 illustrates with the aid of a graph 50 how the reflectance with a percentile scale keeps constant over a period of fifty hours at a temperature of around 806–810° C. with a grating produced in accordance with the present invention.

The illustration given in FIG. 10 shows how a light waveguide 52 in an unloaded state is fed with a broadband light source in accordance with box 56. The direction of the light is indicated in the core 18 of the waveguide with a hollow arrow. The grating 28 reflects light within a narrow band wavelength interval to which the grating is tuned, in accordance with the solid arrow in the core 18 for box 58. The original light propagates through the grating without the reflected light, as illustrated in box 60.

In FIG. 11, the waveguide 52 in FIG. 10 has been subjected to a load, e.g. strain, heating, touch, etc., causing the original, reflected wavelength interval in box 58 to be displaced and resulting in the reflection of a completely different wavelength interval according to box 64 than was the case in FIG. 10, wherewith the light in box 66 is the light that propagates through the grating 28 without the light of the reflected wavelength.

The grating shown in FIG. 12 may also be positioned obliquely so that the reflected wavelength will be directed and led out of the fibre 52 for processing or reading in another optical device.

It will be understood that the invention is not restricted to the aforedescribed and illustrated embodiments, and that the invention is limited solely to the contents of the accompanying claims.

What is claimed is:

1. A method of providing an optical element with a periodically spatially varying chemical composition, comprising the steps of
    a) diffusing at least one mobile substance in the optical element;
    b) periodically inducing at least one chemical reaction between the diffused substance or substances and the optical element, by delivering energy by electromagnetic radiation via optical writing or by a predetermined temperature increase;
    c) changing the temperature of the optical element to a predetermined temperature level so that said diffused substance or substances that has not chemically reacted in said step b) diffuses out of the optical element; and
    d) heating the optical element to a predetermined temperature higher than employed in said step c) by changing the energy supply to complete a reaction to diffuse out substances from the optical element to obtain a stable chemically varying optical element having periodically varying optical properties.

2. A method according to claim 1, comprising combining or repeating at least two of said steps c) and d).

3. A method according to claim 1 or 2, wherein said optical element includes fluorine, and is supplied with hydrogen, nitrogen, oxygen or a combination thereof via diffusion in said step a), obtaining a higher concentration of hydroxyl groups that react with fluorine in said step d) to form hydrogen fluoride in said step d) which can readily be diffused out of said optical element.

4. A method according to claim 1 or 2, wherein the optical element includes halogens and is supplied with hydrogen, nitrogen, oxygen or a combination thereof via diffusion in said step a), obtaining a higher concentration of hydroxyl groups in said step b) that react chemically with said halogens in said step d) to form substances that consist totally or partially of hydrogen and halogens, which can readily be caused to diffuse out of said optical element.

5. A method according to claim 1 or 2, wherein the optical element includes alkali metals and is supplied with hydrogen, nitrogen, oxygen or a combination thereof via diffusion in said step a), such as to obtain a higher concentration of hydroxyl groups in said step b), which react with said alkali metals to form substances that consist totally or partially of hydrogen and alkali metals in said step d), which can be readily caused to diffuse out of or within said optical element.

6. A method according to claim 3 wherein the optical element is comprised partially of silicon dioxide ($SiO_2$), germanium oxide ($GeO_2$), and said fluorine.

7. A method according to claim 3, wherein the optical element is comprised partially silicon dioxide ($SiO_2$), phosphorous oxide $P_2O_s$) and said fluorine.

8. A method according to claims 1 or 2, wherein the optical element is a waveguide structure for conducting electromagnetic radiation.

9. A method according to claim 8, wherein the waveguide structure is an optical fiber.

10. A method according to claims 1 or 2, wherein steps b)–d) produce a periodic variation in refractive index of said optical element.

11. A method according to claims 1 or 2, wherein said steps b)–d) result in spatially varying optical properties.

12. A method according to claim 11, wherein said properties are variations in the non-linearities of the optical element and/or its electro-magneto optical properties.

13. The method of claim 1 wherein said step c) comprises heating the optical element to increase the rate of diffusion.

14. A process of forming an optical element comprised of an optical material having a periodically spatially varying chemical composition which comprises:
    a) providing a mobile substance diffused in said optical material;
    b) inducing a chemical reaction between only a portion of the mobile substance provided in said step a) in a fixed periodic spatially varying concentration to form an intermediate product by applying periodically varying radiation to said optical material having said mobile substance diffused therein;

c) diffusing, subsequent to said step b), unreacted mobile substance out of said optical material including the mobile substance; and d) heating the optical element to a predetermined level to further react the intermediate product with a constituent of said optical material and to remove a portion of this reaction of the intermediate product from said optical material to periodically vary an optical quality of the optical material.

15. The method of claim 14 wherein said step b) of inducing is performed to create variations in said optical element by activating only a portion of said mobile substance.

16. The process of claim 14 wherein said step b) of inducing is achieved by applying a pattern of electromagnetic radiation to said optical material.

17. The process of claim 14 wherein said step c) includes heating the optical material to speed the diffusion of the inactivated mobile substance out of the optical material.

18. The process of claim 17 wherein the periodic variation in the optical quality is a periodic variation in the refractive index achieved by a periodic variation in fluorine in said optical material.

* * * * *